US009948907B2

(12) United States Patent
Liu

(10) Patent No.: US 9,948,907 B2
(45) Date of Patent: Apr. 17, 2018

(54) CONTROL METHOD AND CONTROL DEVICE

(71) Applicant: Lenovo (Beijing) Co., Ltd., Beijing (CN)

(72) Inventor: Yunhui Liu, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 132 days.

(21) Appl. No.: 14/751,877

(22) Filed: Jun. 26, 2015

(65) Prior Publication Data

US 2016/0274677 A1    Sep. 22, 2016

(30) Foreign Application Priority Data

Mar. 18, 2015   (CN) .......................... 2015 1 0119310

(51) Int. Cl.
*G06F 3/042*    (2006.01)
*H04N 9/31*    (2006.01)
*G06F 1/16*    (2006.01)
*G06F 3/00*    (2006.01)

(52) U.S. Cl.
CPC ............ *H04N 9/31* (2013.01); *G06F 1/1639* (2013.01); *G06F 1/1643* (2013.01); *G06F 1/1686* (2013.01); *G06F 3/005* (2013.01); *G06F 3/042* (2013.01); *G06F 3/0425* (2013.01); *H04N 9/3194* (2013.01)

(58) Field of Classification Search
CPC ...... G06F 3/033; G06F 3/0425; H04N 9/3194
See application file for complete search history.

(56) References Cited

U.S. PATENT DOCUMENTS

| 8,322,863 B1* | 12/2012 | Cho | H04N 9/3194 353/70 |
|---|---|---|---|
| 8,382,295 B1* | 2/2013 | Kim | H04N 9/31 348/552 |
| 9,369,632 B2* | 6/2016 | Short | H04N 7/142 |
| 2003/0128188 A1* | 7/2003 | Wilbrink | G06F 1/1626 345/158 |
| 2007/0159453 A1* | 7/2007 | Inoue | G06F 1/1616 345/156 |
| 2008/0018591 A1* | 1/2008 | Pittel | G06F 1/1616 345/156 |
| 2009/0122275 A1* | 5/2009 | Nagashima | H04N 9/3129 353/85 |

(Continued)

*Primary Examiner* — Nicholas Lee
*Assistant Examiner* — Robert Stone
(74) *Attorney, Agent, or Firm* — Harness, Dickey & Pierce, P.L.C.

(57) ABSTRACT

A control method and a control device are provided. The control method includes: detecting first action information of an operator in a first detection mode, determining a first projection object on the projection screen and performing a first control operation on the first projection object according to the first action information in a case that the projection module is in a first projection mode; and detecting second action information of an operator in a second detection mode, determining a second projection object on the projection screen and performing a second control operation on the second projection object according to the second action information in a case that the projection module is in a second projection mode, where the first projection mode is different from the second projection mode.

9 Claims, 5 Drawing Sheets

(56) References Cited

U.S. PATENT DOCUMENTS

| | | | |
|---|---|---|---|
| 2009/0295730 A1* | 12/2009 | Shin | G06F 3/0221 345/168 |
| 2010/0095206 A1* | 4/2010 | Kim | G06F 3/017 715/702 |
| 2010/0137026 A1* | 6/2010 | Kim | H04N 9/3173 455/556.1 |
| 2010/0234077 A1* | 9/2010 | Yoo | G06F 1/1626 455/566 |
| 2012/0194561 A1* | 8/2012 | Grossinger | G06F 3/017 345/661 |
| 2012/0194738 A1* | 8/2012 | Wang | G06F 1/1632 348/552 |
| 2012/0280909 A1* | 11/2012 | Sugimoto | G06F 3/0386 345/158 |
| 2013/0044193 A1* | 2/2013 | Kulkarni | G06K 9/00671 348/51 |
| 2013/0162521 A1* | 6/2013 | Lee | H04N 9/3194 345/156 |
| 2013/0229396 A1* | 9/2013 | Huebner | H04N 9/3147 345/207 |
| 2014/0085192 A1* | 3/2014 | Posa | G09G 3/001 345/156 |
| 2014/0176505 A1* | 6/2014 | Arai | G06F 3/0426 345/175 |
| 2014/0253884 A1* | 9/2014 | Kuki | G03B 21/142 353/85 |
| 2014/0354602 A1* | 12/2014 | He | G06F 3/017 345/175 |
| 2015/0160910 A1* | 6/2015 | Zhang | G06F 3/1423 345/3.1 |
| 2015/0185841 A1* | 7/2015 | Levesque | G06F 3/016 715/702 |
| 2016/0216771 A1* | 7/2016 | Chen | G06F 3/017 |
| 2016/0364007 A1* | 12/2016 | Kamovich | G06F 3/0488 |

* cited by examiner

CONTROL METHOD AND CONTROL DEVICE

CROSS REFERENCE TO RELATED APPLICATIONS

The present application claims the priority to Chinese Patent Application No. 201510119310.X, entitled "CONTROL METHOD AND CONTROL DEVICE", filed on Mar. 18, 2015 with the State Intellectual Property Office of People's Republic of China, which is incorporated herein by reference in its entirety.

FIELD

The disclosure relates to the field of electronic technology, and in particular, to a control method and a control device.

BACKGROUND

In future times for intelligent electronic apparatuses, it will be a major development trend that the electronic apparatuses have a projection function. Particularly, for electronic apparatuses in pursuit of big screen and small volume, projection has better mobility and expandability, and lower cost than a liquid crystal screen. Furthermore, with a function of interactive projection, the electronic apparatus extends a new interactive screen.

Currently, for the electronic apparatus with a function of interactive projection function, generally a projection screen is configured to be a touch screen, and action information of an operator on the projection screen is detected directly to control projection content. However, in this way, the interactive control of the projection content is inaccurate in a case that the action information on the projection screen cannot be acquired or be acquired accurately due to a projection angle and a projection direction of the projection screen.

SUMMARY

A control method is provided, which is applied to an electronic apparatus, where the electronic apparatus includes a projection module and is capable of projecting output content onto a projection screen via the projection module, and the control method includes:

detecting first action information of an operator in a first detection mode, determining a first projection object on the projection screen and performing a first control operation on the first projection object according to the first action information, in a case that the projection module is in a first projection mode; and detecting second action information of an operator in a second detection mode, determining a second projection object on the projection screen and performing a second control operation on the second projection object according to the second action information, in a case that the projection module is in a second projection mode, where the first projection mode is different from the second projection mode.

A control device is provided, which is applied to an electronic apparatus, where the electronic apparatus includes a projection module and is capable of projecting output content onto a projection screen via the projection module, and the control device includes:

a first detection module configured to detect first action information of an operator in a first detection mode in a case that the projection module is in a first projection mode;

a first processing module configured to determine a first projection object on the projection screen and perform a first control operation on the first projection object according to the first action information;

a second detection module configured to detect second action information of an operator in a second detection mode in a case that the projection module is in a second projection mode; and a second processing module configured to determine a second projection object on the projection screen and perform a second control operation on the second projection object according to the second action information, where the first projection mode is different from the second projection mode.

BRIEF DESCRIPTION OF THE DRAWINGS

In order to illustrate technical solutions according to embodiments of the disclosure or in the conventional technology more clearly, the following briefly describes the drawings according to embodiments of the disclosure. Apparently, the drawings are only some embodiments of the present disclosure, and other drawings may be obtained by those skilled in the art according to those drawings without creative efforts.

DETAILED DESCRIPTION

Technical solutions of the embodiments of the present disclosure will be illustrated completely and clearly in combination with the following drawings of the embodiments of the disclosure. Apparently, the described embodiments are merely a few rather than all of the embodiments of the present disclosure. All other embodiments obtained by persons of ordinary skill in the art based on the embodiment of the present disclosure without creative efforts shall fall within the protection scope of the present disclosure.

In the embodiments of the disclosure, for any two different projection modes of a projection module, the electronic apparatus may detect action information of an operator in different detection modes. The first action information of the operator is detected in the first detection mode in a case that the projection module is in the first projection mode, and the second action information of the operator is detected in the second detection mode in a case that the projection module is in the second projection mode. Thus, a corresponding control operation is performed on the projection object on the projection screen according to the first action information or the second action information, thereby satisfying the interactive requirements of the electronic apparatus in different projection modes. Therefore, different detection modes, rather than only one detection mode, can be used to detect the action information of the operator, for respective projection modes, thereby improving the accuracy of detection and improving the accuracy of controlling projection content.

The embodiments of the disclosure are described in detail in conjunction with the drawings hereinafter.

Figure 1:
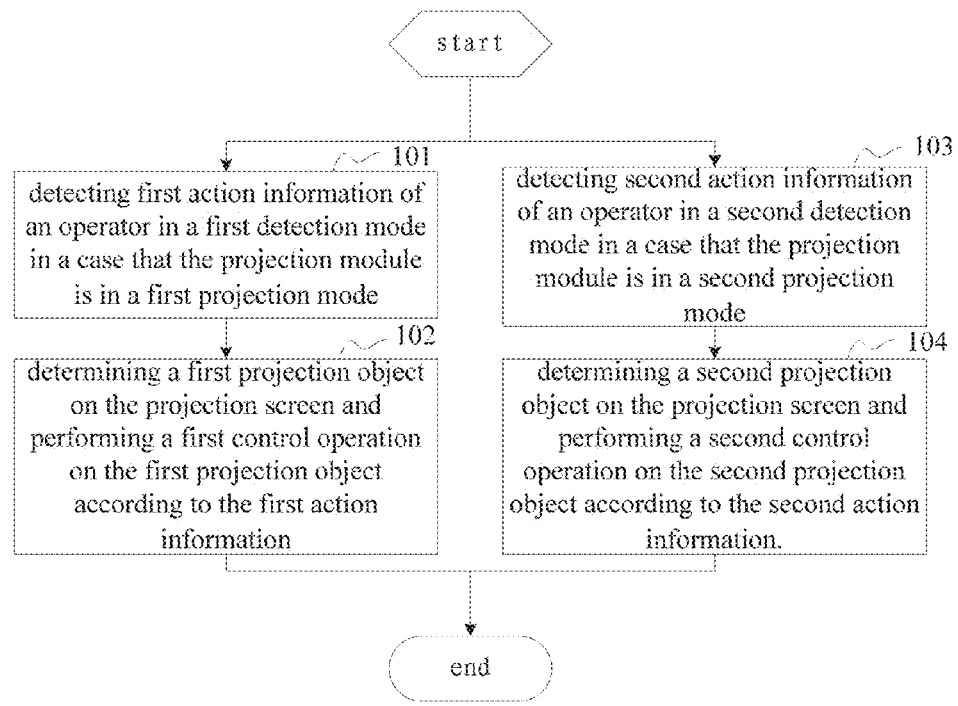
FIG. 1 is a flowchart of a control method according to an embodiment of the disclosure.

FIG. 1 is a flowchart of a control method according to an embodiment of the disclosure. The technical solution according to the embodiment of the disclosure is applied to an electronic apparatus. The electronic apparatus includes a projection module and is capable of projecting output content onto a projection screen via the projection module.

The control method may include the following steps 101 to 104.

In step 101, first action information of an operator is detected in a first detection mode in a case that the projection module is in a first projection mode.

In step 102, a first projection object on the projection screen is determined and a first control operation is performed on the first projection object according to the first action information.

In step 103, second action information of an operator is detected in a second detection mode in a case that the projection module is in a second projection mode.

In step 104, a second projection object on the projection screen is determined and a second control operation is performed on the second projection object according to the second action information.

The first projection mode is different from the second projection mode.

In the embodiment of the disclosure, the projection module of the electronic apparatus has at least a first projection mode and a second projection mode. The electronic apparatus may have multiple projection modes. The multiple projection modes may result from different projection parameters of the projection module such as a projection angle and a projection direction.

For the electronic apparatus using the interactive projection technology, the action information of the operator may be acquired, and the control operation is performed on the projection content according to the action information of the operator. The projection content may be controlled without operating a physical button of the electronic apparatus. In the conventional technology, the operator operates on the projection screen, and the action information of the operator on the projection screen is acquired, thereby achieving a touch operation on the projection content on the projection screen. The conventional way for controlling projection content is single and is only applicable to one projection mode. In a case that the electronic apparatus has at least two different projection modes, the action information of the operator on the projection screen may not be acquired or be acquired accurately in different projection modes, and thus the interactive control cannot be achieved accurately.

In the embodiment of the disclosure, any two different projection modes of the electronic apparatus are named as a first projection mode and a second projection mode, for convenient distinction. The electronic apparatus may detect the operator in different detection modes. The first action information of the operator is detected in the first detection mode in a case that the projection module is in the first projection mode, and the second action information of the operator is detected in the second detection mode in a case that the projection module is in the second projection mode. Thus, a corresponding control operation is performed on the projection object on the projection screen according to the first action information or the second action information, which satisfies the requirements of the interactive control of the electronic apparatus in different projection modes. Therefore, different detection modes, rather than only one detection mode, can be used to detect the action information of the operator, for respective projection modes, thereby improving the accuracy of detection and improving the accuracy of interactive control.

Figure 2A:
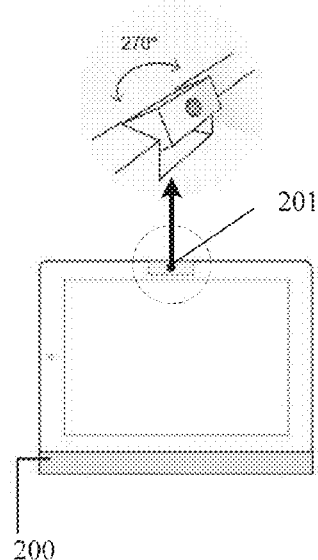
FIG. 2a is a schematic structural diagram of a projection module in an electronic apparatus according to an embodiment of the disclosure.

The different projection modes of the electronic apparatus may result from different projection parameters of the projection module such as a projection angle and a projection direction. In another embodiment of the disclosure, the projection module in the electronic apparatus according to the disclosure is rotatable around the electronic apparatus within a predetermined angular range. For example, it is assumed that the projection module is arranged on a side edge of the electronic apparatus, the projection module may be rotated by pivoting the side edge. FIG. 2a shows a schematic structural diagram of a projection module in an electronic apparatus. The projection module 201 is arranged on a side edge of the electronic apparatus 200 and can be rotated by pivoting the side edge of the electronic apparatus 200 where the projection module 201 is located, and the rotation angle thereof ranges, for example, from 0 degree to 270 degrees.

In order to ensure the accuracy of the projection content, the projection screen may have different positions according to the rotation angle of the projection module.

Figure 2B:
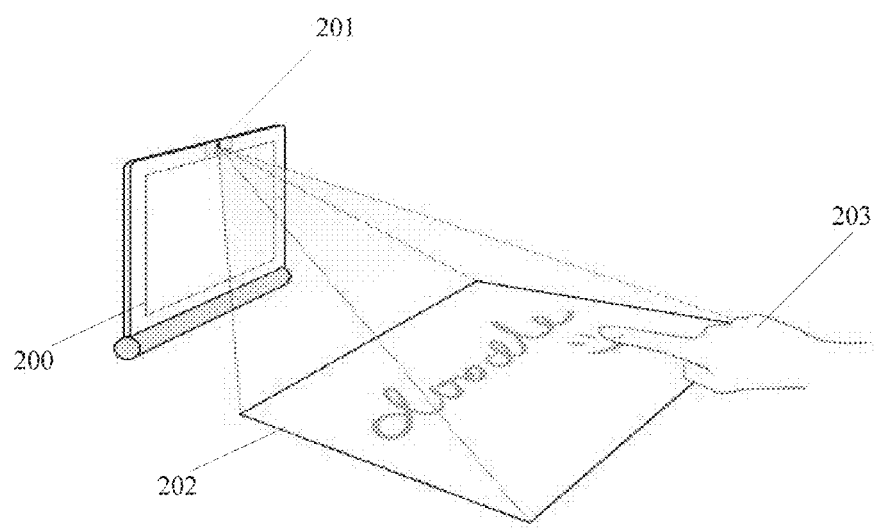
FIG. 2b is a schematic diagram of a first projection mode of the projection module according to an embodiment of the disclosure.
Figure 2C:
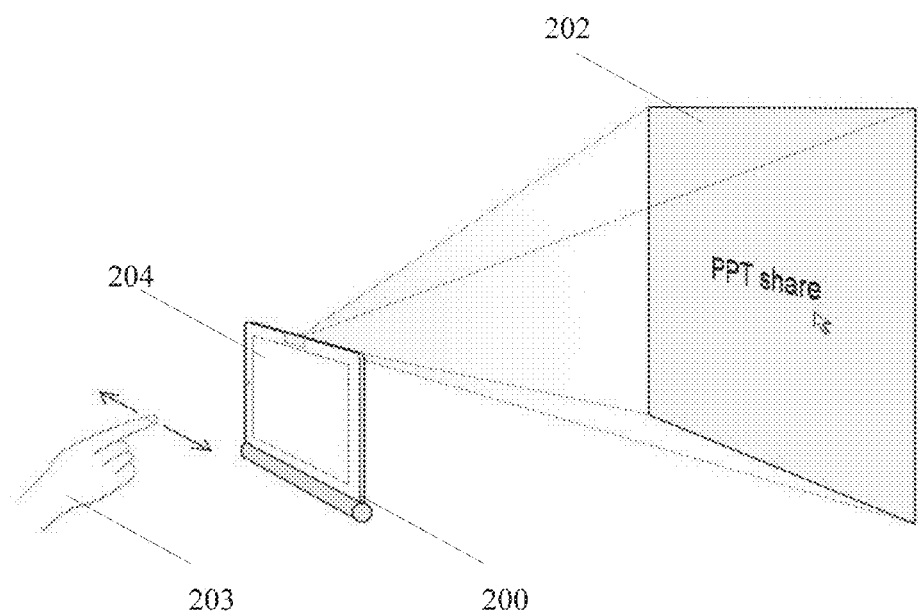
FIG. 2c is a schematic diagram of a second projection mode of the projection module according to an embodiment of the disclosure.

FIG. 2b and FIG. 2c show two different projection modes of the electronic apparatus respectively.

In FIG. 2b, it may be determined that the electronic apparatus 200 is in the first projection mode, in a case that the projection module 201 in the electronic apparatus 200 is rotated around the electronic apparatus 200 to an angle within a first angular range. In this case, the projection screen 202 is close to the electronic apparatus, which belongs to a short-distance projection.

It may be determined that the electronic apparatus 200 is in the second projection mode, in a case that the projection module 201 in the electronic apparatus 200 is rotated around the electronic apparatus 200 to an angle within a second angular range. In this case, the projection screen 202 is far away from the electronic apparatus, which belongs to a long-distance projection.

In a possible implementation, the first projection mode may be a short-distance projection mode, that is, the distance between the projection module and the projection screen is short; and the second projection mode may be a long-distance projection mode, that is, the distance between the projection module and the projection screen is long.

In the embodiment, the first projection mode and the second projection mode of the electronic apparatus may be determined in the following ways:

determining that the projection module is in the first projection mode, in a case that the projection module is rotated to an angle within a first angular range to perform projection; and determining that the projection module is in the second projection mode, in a case that the projection module is rotated to an angle within a second angular range to perform projection;

alternatively, determining that the projection module is in the first projection mode, in a case that the distance between the projection module and the projection screen is less than a predetermined distance; and determining that the projection module is in the second projection mode, in a case that the distance between the projection module and the projection screen is greater than the predetermined distance.

As can be seen from the above description, in another embodiment of the disclosure, the first detection mode may refer to detecting the first action information of the operator on the projection screen.

That is, the detecting first action information of an operator in a first detection mode in a case that the projection module is in a first projection mode may include:

detecting the first action information of the operator on the projection screen in a case that the projection module is in the first projection mode.

In a case that the projection module is in the first projection mode, i.e., the short-distance projection mode, the operator may perform a corresponding action on the projection screen, and the electronic apparatus may detect the first action information of the operator on the projection screen in the conventional detection mode, i.e., the first detection mode. Since the projection screen is close to the projection module, the first action information of the operator may be acquired accurately, without causing big error. In this case, a projection object corresponding to an operating position of the operator on the projection screen is the first projection object, and thus a control operation may be performed on the projection object according to the first action information.

The first action information may be an operation such as a click, a double click, or a drag, etc, and thus the achieved control operation may be selecting, opening or moving the first projection object.

Therefore, in the embodiment, the determining a first projection object on the projection screen and performing a first control operation on the first projection object according to the first action information may include:

determining the first projection object corresponding to the operating position of the operator on the projection screen; and performing the control operation on the first projection object according to the first action information.

As shown in FIG. 2b, the operator 203 performs an action on the projection screen 202. An acquisition module may be arranged in the electronic apparatus, and the projection screen is located within an acquisition range of the acquisition module. The action information of the operator on the projection screen may be acquired via the acquisition module. Thus, the projection object may be determined and the corresponding control operation may be performed.

In a case that the electronic apparatus is in the second projection mode, i.e., the long-distance projection mode, since the projection screen is far away from the projection module, that is, the projection screen is far away from the electronic apparatus, if the action information of the operator on the projection screen is acquired by the electrical device in the first detection mode, the action information of the operator may not be acquired or be acquired accurately, and thus the projection content cannot be controlled accurately. Therefore, the second detection mode different from the first detection mode is used to detect the second action information of the operator in the embodiment.

In another embodiment of the disclosure, the second detection mode may refer to that the second action information of the operator is detected within a predetermined space range on a side of the electronic apparatus opposite to the projection screen.

The projection screen is far away from the projection module in the second projection mode.

Therefore, the detecting second action information of an operator in a second detection mode in a case that the projection module is in a second projection mode may include:

detecting the second action information of the operator within a predetermined space range on the side of the electronic apparatus opposite to the projection screen, in a case that the projection module is in the second projection mode.

The determining a second projection object on the projection screen and performing a second control operation on the second projection object according to the second action information may include:

determining the second projection object operated by the operator by mapping the operator onto the projection screen; and performing the control operation on the second projection object according to the second action information.

That is, the second action information of the operator may be acquired within the predetermined space range on the side of the electronic apparatus opposite to the projection direction of the projection module. As shown in FIG. 2c, the projection module is located on a first surface of the electronic apparatus through rotation, the surface of the electronic apparatus opposite to the projection direction is a second surface 204, and the first surface is opposite to the second surface 204.

The operator may perform an action within the predetermined space range corresponding to the second surface 204, and the electronic apparatus may acquire the second action information within the predetermined space range.

The second projection object operated by the operator may be determined by mapping the operator onto the projection screen, and the control operation is performed on the second projection object.

The electronic apparatus can still perform identification, determine the projection object and perform the corresponding operation, by performing actions within the predetermined space range on the side of the electronic apparatus opposite to the projection screen, without performing an action on the projection screen, thereby avoiding inaccurate control by using the first detection mode in a case that the projection screen is far away from the electronic apparatus.

The second action information may be an operation such as a click, a double click, or a drag, and thus the achieved control operation may be selecting, opening or moving the first projection object.

Figure 3:
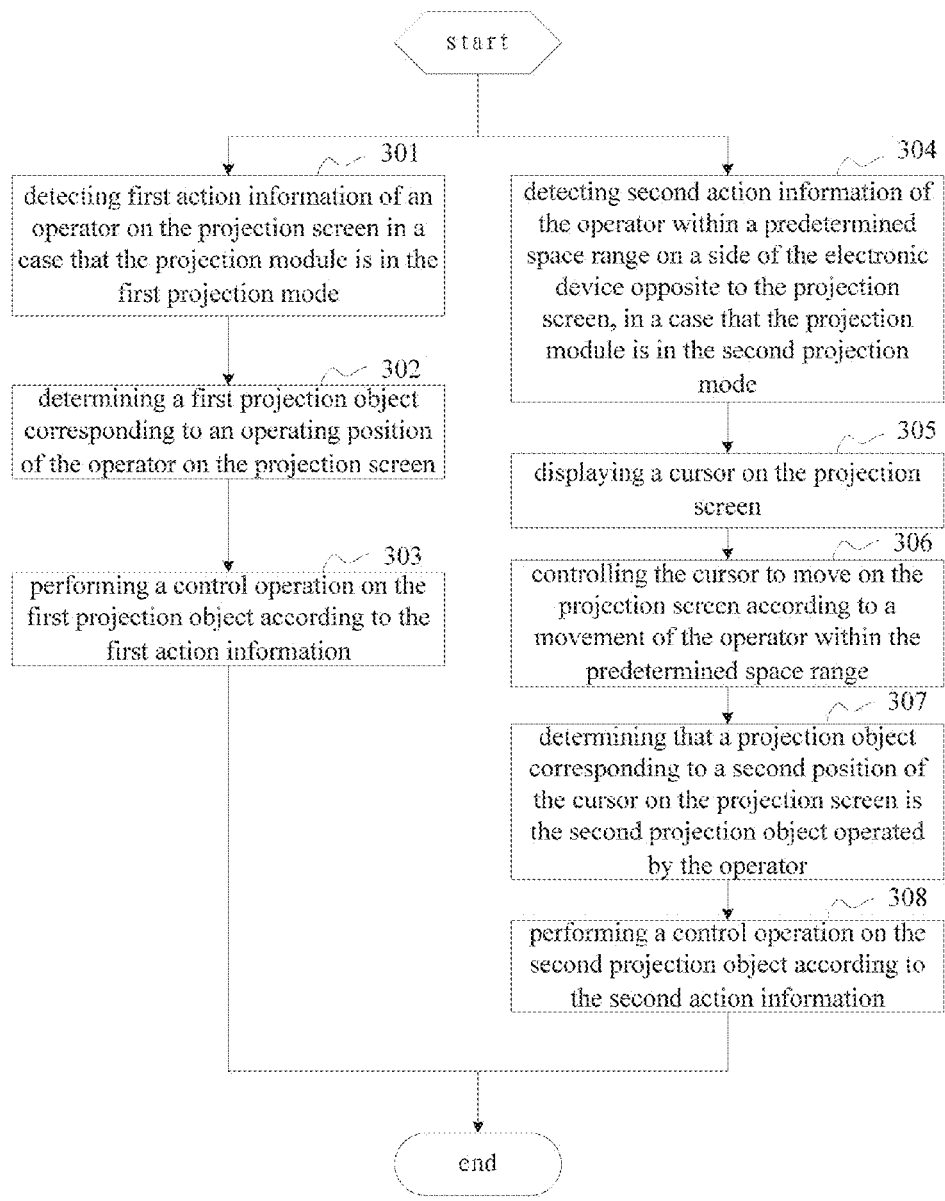
FIG. 3 is a flowchart of a control method according to another embodiment of the disclosure.

In the second projection mode, the second projection object may be determined in various ways. FIG. 3 is a flowchart of a control method according to another embodiment of the disclosure. The control method may include steps 301 to 308.

In step 301, first action information of an operator is detected on the projection screen in a case that the projection module is in the first projection mode.

In step 302, a first projection object corresponding to an operating position of the operator on the projection screen is determined.

In step 303, a control operation is performed on the first projection object according to the first action information.

For the determination of the first projection mode and the second projection mode, reference may be made to the description of the above embodiments, and for the implementation of the first detection mode in a case that the projection module is in the first projection mode, reference may also be made to the description of the above embodiments, which are omitted herein.

In step 304, second action information of the operator is detected within a predetermined space range on a side of the electronic apparatus opposite to the projection screen, in a case that the projection module is in the second projection mode.

In step 305, a cursor is displayed on the projection screen.

In step 306, the cursor is controlled to move on the projection screen according to a movement of the operator within the predetermined space range.

In step 307, it is determined that a projection object corresponding to a second position of the cursor on the projection screen is the second projection object operated by the operator in a case that the operator is located at the first position satisfying the predetermined condition within the predetermined space range.

As a possible implementation, the predetermined condition may refer to that a position where the operator stays for a period of time greater than a predetermined period of time within the predetermined space range is the first position.

Alternatively, the predetermined condition may refer to that a position where the operator performs a predetermined action within the predetermined space range is the first position.

In step 308, a control operation is performed on the second projection object according to the second action information.

In the embodiment of the disclosure, the cursor may be displayed on the projection screen in a case that the projection module is in the second projection mode. Specifically, the cursor may be displayed on the projection screen after the operator is detected within the predetermined space range.

The position of the cursor on the projection screen may be changed as the position of the operator within the predetermined space range is changed. Thus, a user may change the position of the cursor on the projection screen and move the cursor to a target position, namely a second position, by changing the position of the operator within the predetermined space range. In this case, the projection content at the second position is the second projection object, and the corresponding control operation may be performed on the second projection object according to the second action information of the operator.

In the embodiment, the second action information of the operator may be detected after the second projection object is determined, so that it may be determined that the detected second action information is performed for the second projection object.

In another embodiment, the electronic apparatus may include a display module, and is capable of displaying the output content via the display module.

Since the projection module is rotatable, the projection module is rotated to the side of the electronic apparatus opposite to the projection screen, in a case that the projection module of the electronic apparatus is in the second projection mode.

In the embodiment of the disclosure, the determining the second projection object operated by the operator by mapping the operator onto the projection screen may include:

determining that projection content on the projection screen corresponding to operation content is the first projection object according to the operation content of the operator on the display module.

The method embodiments are illustrated as a series of steps for simple description, but those skilled in the art should know that the disclosure is not limited to the described sequence of the steps. Some steps may be performed in other sequence or performed simultaneously according to the disclosure. Furthermore, those skilled in the art should know that the embodiments described in the specification are preferred embodiments, and the involved steps and modules are not essential for the disclosure.

Figure 4:
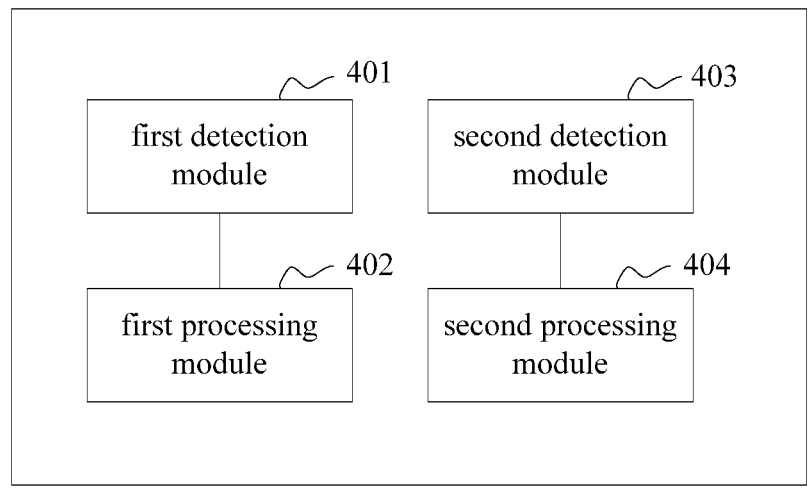
FIG. 4 is a schematic structural diagram of a control device according to an embodiment of the disclosure.

FIG. 4 is a schematic structural diagram of a control device according to an embodiment of the disclosure. The control device is applied to an electronic apparatus, and the electronic apparatus includes a projection module and is capable of projecting output content onto a projection screen via the projection module.

The control device may include: a first detection module 401, a first processing module 402, a second detection module 403 and a second processing module 404.

The first detection module 401 is configured to detect first action information of an operator in a first detection mode in a case that the projection module is in a first projection mode.

The first processing module 402 is configured to determine a first projection object on the projection screen and perform a first control operation on the first projection object according to the first action information.

The second detection module 403 is configured to detect second action information of the operator in a second detection mode in a case that the projection module is in a second projection mode.

The second processing module 404 is configured to determine a second projection object on the projection screen and perform a second control operation on the second projection object according to the second action information.

The first projection mode is different from the second projection mode.

The projection module of the electronic apparatus has at least the first projection mode and the second projection mode. The electronic apparatus may have multiple projection modes. The multiple projection modes may result from different projection parameters of the projection module such as a projection angle and a projection direction.

In the embodiment of the disclosure, for any two different projection modes of the electronic apparatus, the electronic apparatus may detect the operator in different detection modes. The first action information of the operator is detected in the first detection mode in a case that the projection module is in first projection mode, and the second action information of the operator is detected in the second detection mode in a case that the projection module is in the second projection mode. Thus, the corresponding control operation is performed on the projection object on the projection screen according to the first action information or the second action information, thereby satisfying requirements of the interactive control of the electronic apparatus in different projection modes. Therefore, different detection modes, rather than only one detection mode, may be used to detect the action information of the operator, for respective projection modes, thereby improving the accuracy of detection and improving the accuracy of interactive control.

The different projection modes of the electronic apparatus may result from different projection parameters of the projection module such as a projection angle and a projection direction. In another embodiment of the disclosure, the projection module of the electronic apparatus according to the disclosure is rotatable around the electronic apparatus within a predetermined angular range.

In a possible implementation, the first projection mode may be a short-distance projection mode, that is, the distance between the projection module and the projection screen is short; and the second projection mode may be a long-distance projection mode, that is, the distance between the projection module and the projection screen is long.

The control device may further include:

a first determination module configured to determine that the projection module is in the first projection mode, in a case that the projection module is rotated to an angle within a first angular range to perform projection; and determine that the projection module is in the second projection mode, in a case that the projection module is rotated to an angle within a second angular range to perform projection; or a second determination module configured to determine that the projection module is in the first projection mode, in a case that the distance between the projection module and the projection screen is less than a predetermined distance; and determine that the projection module is in the second projection mode, in a case that the distance between the projection module and the projection screen is greater than the predetermined distance.

Therefore, the projection mode which the projection module is currently in may be determined by the first determination module or the second determination module.

Figure 5:
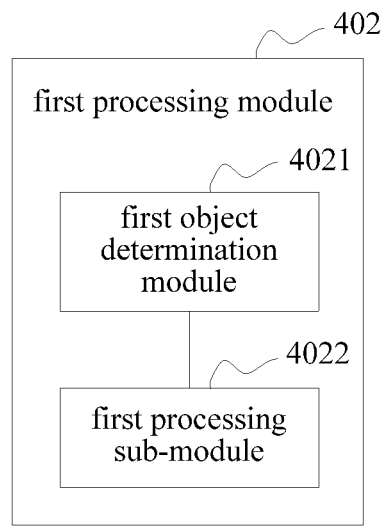
FIG. 5 is a schematic structural diagram of a control device according to still another embodiment of the disclosure.

The detection modes are different in different projection modes. In another embodiment of the disclosure, as shown in FIG. 5, the first detection module 401 may be configured to detect the first action information of the operator on the projection screen in a case that the projection module is in the first projection mode; and the first processing module 402 includes a first object determination module 501 and a first processing sub-module 502.

The first object determination module 501 is configured to determine the first projection object corresponding to an operating position of the operator on the projection screen.

The first processing sub-module 502 is configured to perform a control operation on the first projection object according to the first action information.

The first detection mode may refer to that the first action information of the operator is detected on the projection screen. In a case that the projection module is in the first projection mode, i.e., the short-distance projection mode, the operator may perform a corresponding action on the projection screen, and the electronic apparatus may detect the first action information of the operator on the projection screen in the conventional detection mode, i.e., the first detection mode. Since the projection screen is close to the projection module, the first action information of the operator may be acquired accurately, without causing big error. In this case, a projection object corresponding to an operating position of the operator on the projection screen is the first projection object, and thus the control operation may be performed on the projection object according to the first action information.

The first action information may be an operation such as a click, a double click, or a drag, etc, and thus the achieved control operation may be selecting, opening or moving the first projection object.

In a case that the electronic apparatus is in the second projection mode, i.e., the long-distance projection mode, since the projection screen is far away from the projection module, that is, the projection screen is far away from the electronic apparatus, if the action information of the operator on the projection screen is acquired by the electronic apparatus in the first detection mode, the action information of the operator may not be acquired or be acquired accurately, and thus the projection content cannot be controlled accurately. Therefore, the second detection mode different from the first detection mode is used to detect the second action information of the operator in the embodiment.

Figure 6:
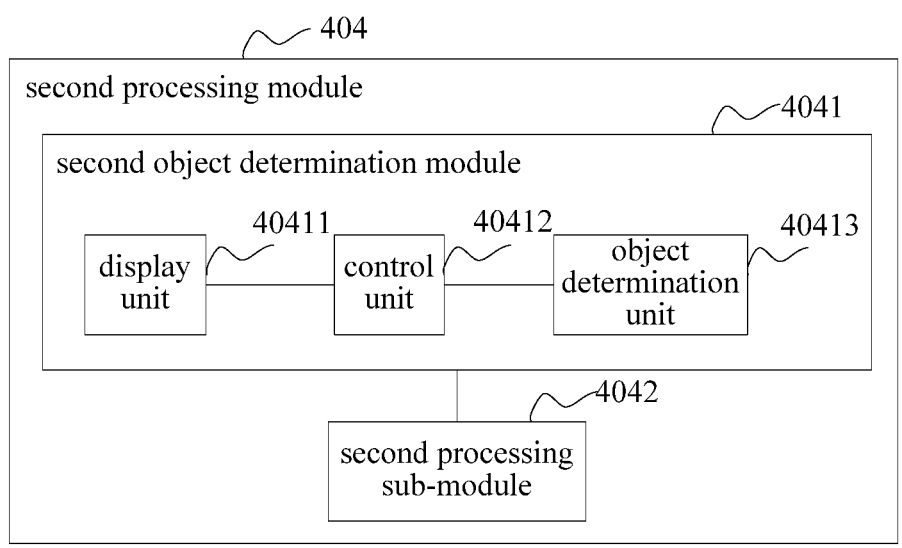
FIG. 6 is a schematic structural diagram of a control device according to yet another embodiment of the disclosure.

In another embodiment of the disclosure, as shown in FIG. 6, the second detection module 403 may be configured to detect the second action information of the operator within a predetermined space range on a side of the electronic apparatus opposite to the projection screen, in a case that the projection module is in the second projection mode; and the second processing module 404 may include: a second object determination module 601 and a second processing sub-module 602.

The second object determination module 601 is configured to determine the second projection object operated by the operator by mapping the operator onto the projection screen.

The second processing sub-module 602 is configured to perform a control operation on the second projection object according to the second action information.

That is, the second action information of the operator may be acquired within the predetermined space range on the side of the electronic apparatus opposite to the projection direction of the projection module.

The second action information may be an operation such as a click, a double click, or a drag, and thus the control operation may be selecting, opening or moving the first projection object.

In the second projection mode, the second projection object may be determined in various ways. In a possible implementation, the second object determination module 601 may include: a display unit 6011, a control unit 6012 and an object determination unit 6013.

The display unit 6011 is configured to display a cursor on the projection screen.

The control unit 6012 is configured to control the cursor to move on the projection screen according to a movement of the operator within the predetermined space range.

The object determination unit 6013 is configured to determine that a projection object corresponding to a second position of the cursor on the projection screen is the second projection object operated by the operator in a case that the operator is located at a first position satisfying the predetermined condition within the predetermined space range.

As a possible implementation, the predetermined condition may refer to that a position where the operator stays for a period of time greater than a predetermined period of time within the predetermined space is the first position.

Alternatively, the predetermined condition may refer to that a position where the operator performs a predetermined action within the predetermined space range is the first position.

In the embodiment, the cursor may be displayed on the projection screen in a case that the projection module is in the second projection mode. Specifically, the cursor may be displayed on the projection screen after the operator is detected within the predetermined space range.

The position of the cursor on the projection screen may be changed as the position of the operator within the predetermined space range is changed. Thus, a user may change the position of the cursor on the projection screen and move the cursor to a target position, namely a second position, by changing the position of the operator within the predetermined space range. In this case, the projection content at the second position is the second projection object, and the corresponding control operation may be performed on the second projection object according to the second action information of the operator.

In the embodiment, the second action information of the operator may be detected after the second projection object is determined, so that it may be determined that the detected second action information is performed on the second projection object.

In another embodiment, the electronic apparatus may include a display module, and the electronic apparatus is capable of displaying the output content via the display module.

Since the projection module is rotatable, the projection module is rotated to the side of the electronic apparatus opposite to the projection screen, in a case that the projection module of the electronic apparatus is in the second projection mode. In this case, the second object determination module 601 may be further configured to determine projection content on the projection screen corresponding to operation content is the first projection object according to the operation content of the operator on the display module.

The embodiments of the present disclosure are described herein in a progressive manner, and each embodiment places emphasis on the difference from other embodiments, therefore one embodiment can refer to other embodiments for the same or similar parts. For the apparatus disclosed in the embodiments, since the apparatus corresponds to the method disclosed in the embodiments, the description is relatively simple, and relevant part of the description may refer to the description according to the method embodiments.

It should be noted that, a relationship term such as "the first" and "the second" herein is only used to distinguish one entity or operation from another entity or operation, and does not necessarily acquire or imply that there is an actual relationship or sequence between these entities or operations. Furthermore, terms "include", "comprise" or any other variations are intended to cover non-exclusive "include", so that a process, a method, an object or a device including a series of factors not only include the factors, but also include other factors not explicitly listed, or also include inherent factors of the process, the method, the object or the device. Without more limitation, a factor defined in a sentence "include one . . . " does not exclude a case that there is also another same factor in the process, the method, the object or the device including the described factor.

With the above descriptions of the disclosed embodiments, those skilled in the art may achieve or use the present disclosure. Various modifications to the embodiments are apparent for those skilled in the art. The general principle defined herein may be implemented in other embodiments without departing from the spirit or scope of the disclosure. Therefore, the present disclosure is not limited to the embodiments disclosed herein, but confirm to the widest scope in consistent with the principle and the novel features disclosed herein.

What is claimed is:

1. A control method comprising:
   detecting first action information of an operator in a first detection mode of an electronic apparatus;
   determining a first projection object on a projection screen and performing a first control operation on the first projection object according to the first action information, in a case that a projection module of the electronic apparatus is in a first projection mode;
   detecting second action information of the operator in a second detection mode of the electronic apparatus; and
   determining a second projection object on the projection screen and performing a second control operation on the second projection object according to the second action information, in a case that the projection module is in a second projection mode,
   wherein the first projection mode is different from the second projection mode,
   wherein the projection module is rotatable around the electronic apparatus within a predetermined angular range, and the first projection mode and the second projection mode are determined in at least one of:
      determining that the projection module is in the first projection mode, in a case that the projection module is rotated to an angle within a first angular range to perform projection, and determining that the projection module is in the second projection mode, in a case that the projection module is rotated to an angle within a second angular range to perform projection; or
      determining that the projection module is in the first projection mode, in a case that a distance between the projection module and the projection screen is less than a predetermined distance, and determining that the projection module is in the second projection mode, in a case that the distance between the projection module and the projection screen is greater than the predetermined distance,
   wherein the detecting second action information of an operator in a second detection mode in a case that the projection module is in a second projection mode comprises:
      detecting the second action information of the operator within a predetermined space range on a side of the electronic apparatus opposite to the projection screen, in a case that the projection module is in the second projection mode,
   wherein the determining a second projection object on the projection screen and performing a second control operation on the second projection object according to the second action information comprises:
      determining the second projection object operated by the operator by mapping the operator onto the projection screen; and
      performing a control operation on the second projection object according to the second action information.

2. The control method according to claim 1, wherein
the detecting first action information of an operator in a first detection mode in a case that the projection module is in a first projection mode comprises:
detecting the first action information of the operator on the projection screen in a case that the projection module is in the first projection mode; and
the determining a first projection object on the projection screen and performing a first control operation on the first projection object according to the first action information comprises:
determining the first projection object corresponding to an operating position of the operator on the projection screen; and
performing a control operation on the first projection object according to the first action information.

3. The control method according to claim 1, wherein the determining the second projection object operated by the operator by mapping the operator onto the projection screen comprises:
  displaying a cursor on the projection screen;
  controlling the cursor to move on the projection screen according to a movement of the operator within the predetermined space range; and
  determining that a projection object corresponding to a second position of the cursor on the projection screen is the second projection object operated by the operator in a case that it is determined that the operator is located at a first position satisfying a predetermined condition within the predetermined space range.

4. The control method according to claim 3, wherein the determination that the operator is located at a first position satisfying the predetermined condition within the predetermined space range comprises:
  determining that a position where the operator stays for a period of time greater than a predetermined period of time within the predetermined space range is the first position.

5. The control method according to claim 1, wherein the electronic apparatus further comprises a display module, and is capable of displaying output content via the display module, the display module is located at a side of the electronic apparatus opposite to the projection screen; and
  the determining the second projection object operated by the operator by mapping the operator onto the projection screen comprises:
  determining that projection content on the projection screen corresponding to operation content is the first projection object according to the operation content of the operator on the display module.

6. A control device applied to an electronic apparatus, wherein the electronic apparatus comprises a projection module and is capable of projecting output content onto a projection screen via the projection module, and the control device comprises:
  a first detection module configured to detect first action information of an operator in a first detection mode in a case that the projection module is in a first projection mode;
  a first processing module configured to determine a first projection object on the projection screen and perform a first control operation on the first projection object according to the first action information;
  a second detection module configured to detect second action information of an operator in a second detection mode in a case that the projection module is in a second projection mode; and
  a second processing module configured to determine a second projection object on the projection screen and perform a second control operation on the second projection object according to the second action information,
  wherein the first projection mode is different from the second projection mode,
  wherein the projection module is rotatable around the electronic apparatus within a predetermined angular range; and the control device further comprises at least one of:
    a first determination module, configured to determine that the projection module is in the first projection mode, in a case that the projection module is rotated to an angle within a first angular range to perform projection, and determine that the projection module is in the second projection mode, in a case that the projection module is rotated to an angle within a second angular range to perform projection; or
    a second determination module configured to determine that the projection module is in the first projection mode, in a case that a distance between the projection module and the projection screen is less than a predetermined distance, and determine that the projection module is in the second projection mode, in a case that the distance between the projection module and the projection screen is greater than the predetermined distance,
  wherein the second detection module is configured to detect the second action information of the operator within a predetermined space range on a side of the electronic apparatus opposite to the projection screen, in a case that the projection module is in the second projection mode, and the second processing module comprises:
    a second object determination module configured to determine the second projection object operated by the operator by mapping the operator onto the projection screen; and
    a second processing sub-module configured to perform a control operation on the second projection object according to the second action information.

7. The control device according to claim 6, wherein the first detection module is configured to detect the first action information of the operator on the projection screen in a case that the projection module is in the first projection mode; and
  the first processing module comprises:
    a first object determination module configured to determine the first projection object corresponding to an operating position of the operator on the projection screen; and
    a first processing sub-module configured to perform a control operation on the first projection object according to the first action information.

8. The control device according to claim 6, wherein the second object determination module comprises:
  a display unit configured to display a cursor on the projection screen;
  a control unit configured to control the cursor to move on the projection screen according to a movement of the operator within the predetermined space range; and
  an object determination unit configured to determine that a projection object corresponding to a second position of the cursor on the projection screen is the second projection object operated by the operator in a case that it is determined that the operator is located at a first position satisfying a predetermined condition within the predetermined space range.

9. The control device according to claim 6, wherein the electronic apparatus further comprises a display module, and is capable of displaying the output content via the display module, and the display module is located at the side of the electronic apparatus opposite to the projection screen; and
  the second object determination module is configured to determine that projection content on the projection screen corresponding to operation content is the first projection object according to the operation content of the operator on the display module.

* * * * *